Patented Apr. 4, 1944

2,345,571

UNITED STATES PATENT OFFICE 2,345,571

VITAMIN FORTIFICATION

André E. Briod, Short Hills, and Loran O. Buxton, Newark, N. J., assignors to National Oil Products Company, Harrison, N. J., a corporation of New Jersey No Drawing. Application May 7, 1942, Serial No. 442,080

10 Claims. (Cl. 99—11)

This invention relates in general to the manufacture of vitamin-fortified foods, and in particular to a process of producing protected high-potency vitamin-containing products in dry form, and to a process of fortifying foods therewith and to correlated improvements in the products thus produced.

The enriching of foods with various vitamins has received a great deal of attention during recent years. Abundant research has been carried on with a view to finding means of successfully incorporating the various vitamins or products rich therein into various foods without affecting the normal taste or odor of the food. This is particularly true when fish liver or like oils or concentrates thereof rich in vitamins A and D are to be incorporated into foods. One of the most important problems, however, is to inhibit oxidation and decomposition of the vitamins subsequent to their incorporation into foods. Heretofore, many proposals have been made in an attempt to accomplish the foregoing purposes. Various proposals have been made for the production of granular products impregnated with fat-soluble vitamins and coated with some substance such as paraffin, soluble gums, waxes, etc., to provide protection for the vitamins against oxidation and decomposition. For example, yeast has been impregnated with cod liver oil and the resulting granular product coated with a film of Karaya gum; cod liver oil has been mixed with paraffin and then dry, granular vegetable material impregnated therewith; other proposals have combined such teachings and employed both a wax and a soluble gum. However, various difficulties have been experienced with the foregoing practices in the way of decomposition. Moreover, the use in foods of extraneous or foreign substances such as Karaya and other gums and paraffin and like waxes is highly undesirable from a physiological standpoint. The general public is reluctant to imbibe in foods containing such foreign substances. Furthermore, such foreign substances tend to interfere with the proper absorption by the body of the vitamins contained in the food or feed.

The general object of the invention is to obviate the foregoing and other disadvantages.

A specific object of the invention is to provide a stable vitamin A and D enriched vegetable matter in dry form which is free from foreign or extraneous substances.

Another object of the invention is to provide a fat-soluble vitamin-enriched product in dry form having enhanced stability.

A further object of the invention is to provide an improved process of producing a fat-soluble vitamin-enriched product in dry form.

An additional object of the invention is to provide improved foods for human or animal consumption fortified with vitamins A and/or D dispersed in a dry carrier.

Other objects of the invention will in part be obvious and will in part appear hereinafter.

We have found that highly stable fat-soluble vitamin-containing products in a dry form may be prepared by coating and/or impregnating relatively oil-free vegetable matter, e. g., vegetable meals, seeds, pulps, etc., containing natural hydrophilic-dispersing substances with an oily material rich in fat-soluble vitamins while maintaining intimate contact of the oil and material with an antioxidant liberated from vegetable material. We prefer to carry out the process of our invention by subjecting antioxidant-containing vegetable meals to the action of acetic acid in the presence or not of an organic solvent or solvent mixture to liberate the natural antioxidants in the vegetable meal; and then, either with or without removing therefrom the acid and solvent when the latter is used, adding a certain amount of water and the vitamin-containing oil thereto, thoroughly and intimately mixing the oil and the water with the vegetable material and the liberated antioxidants; and finally removing the water and any acid and solvent present from the mass to provide the vitamin-fortified vegetable material of the invention. There are, of course, other obvious variations of the process which may be employed; for example, if the vegetable material which it is desired to employ in the process of the invention contains only a relatively small amount of natural antioxidants, one may add suitable natural antioxidants to the solvent-vegetable material mixture. If the vegetable material is substantially completely oil-free, e. g., a solvent-extracted meal, the use of a solvent is of no advantage as acidified water will liberate the antioxidants from the vegetable material and concurrently prepare the slurry of the vegetable material to which the vitamin-rich material is to be added. If the vegetable meal contains some oil such as found in expeller and cold pressed oil-bearing seed meals, it is advantageous to employ an organic solvent along with the acetic acid to assist in liberating the natural antioxidants present in the meal. In any case, the resulting dry product which usually comprises an agglomerated mass of vegetable particles coated and/or impregnated with the material rich in a fat-soluble vitamin and bearing an outer protective film of protein, pectin, carbohydrate, and/or other natural hydrophilic substances normally present in the original vegetable matter, may be used as such or reduced to a comminuted form and incorporated into foods or molded into desired shapes for direct consumption. The products have remarkable stability with respect to their vitamin potency even after storage in the presence of air for long periods of time. This phenomenon is apparently due not only to the air-excluding film formed about each particle by the natural hydrophilic substances, whereby the vitamins are protected from the usual oxidizing influences of the atmosphere, but also to the natural antioxidants which are liberated in the vegetable material through the action of the acetic acid, which antioxidants are caused to become intimately associated with the vitamins in the final product.

In carrying out the process of the invention, any suitable relatively oil-free vegetable meal in dry form containing natural antioxidants and protein, pectin, carbohydrate and/or like naturally occurring hydrophilic substances, is thoroughly admixed with acetic acid in to liberate the antioxidants. As aforementioned, an aqueous acetic acid solution or an organic solvent-acetic acid mixture may be employed in liberating the antioxidants, depending upon the type of vegetable matter being used. After the antioxidants have been liberated, it is preferred to remove the organic solvent or solvents when they are used to prevent any interference with the formation of the aqueous slurry. The acetic acid may be removed if desired, but this is not essential; in fact, in many cases it is desirable to permit the acid to remain and be driven off during the final drying step. The resulting mass is now thoroughly admixed with water to form a paste or slurry, during which operation the water will dissolve or hydrate the hydrophilic matter present in the vegetable material. The amount of water used should be controlled so as to obtain the proper consistency in the mass, which should, in turn, be governed according to the particular manner in which the product is to be dried. If the product is to be dried in pans, the consistency of the slurry should be such as to prevent any appreciable settling during the drying step. On the other hand, a slurry of lower consistency is desirable when the product is to be dried on a moving surface such as a roller drier or the like.

When a smooth and homogeneous paste or slurry of the proper consistency has been prepared, any suitable material rich in vitamins A and/or D is dispersed in the mass. The vitamin-rich material is preferably added gradually with continuous stirring. Any suitable material rich in vitamins A and/or D may be used, such as cod, swordfish, tuna, halibut and other vitamin-containing fish or fish liver oils, palm oil, concentrates and fractions thereof, fish liver oils fortified with a vitamin A and/or D concentrate, oil solutions of chemically or electrically activated sterols, such as irradiated ergosterol, irradiated 7-dehydro-cholesterol, or other similar substances. During the step of dispersing or emulsifying the vitamin-rich material in the mass, the vitamin material apparently coats and/or impregnates the individual vegetable particles, which are in turn coated with a film of the protein, pectin, carbohydrate and/or other hydrophilic substances present, thereby forming the disperse phase of the resulting dispersion. Furthermore, the antioxidants which have been liberated from the vegetable material by the acetic acid-solvent treatment become intimately associated with the vitamins and thus are able to very efficiently aid in protecting the vitamins from oxidizing influences both during the drying of the mass and subsequently during the storage and use of the dry vitamin food product. The expression "bearing" is used in the appended claims to cover both an impregnated and/or a coated product.

The foregoing product is subjected to drying by any suitable means under appropriate conditions. The mass may be spread in shallow trays and subjected to moderate heat in a chamber maintained under reduced pressure or the mass may be spray dried or passed over a roller drier of known constuction. During the drying step, the structure and relationship of the individual particles in the disperse phase is not changed to any appreciable extent. While the particles tend to agglomerate, they each comprise a nucleus of vegetable material which is coated and/or impregnated with vitamin-rich material associated with the natural antioxidants, the whole being enveloped in an air-excluding film of protein, pectin, carbohydrate and/or like hydrophilic substances.

While the mass may be used as such, it is preferable to crush or otherwise comminute the same so that it may be readily molded or pressed into predetermined shapes or blended or admixed with a food or feed of a suitable type. In subdividing the dried mass, the size of the resulting particles may be controlled to suit the desired conditions. The size of the particles should be preferably the same or at least approximate the size of the particles of the food or feed to be fortified to inhibit settling of the vitamin-enriched material during storage or while in transit.

As aforementioned, the carrier for the vitamin-rich material may comprise any suitable antioxidant-containing vegetable matter which inherently contains proteins, pectins, carbohydrates and/or other hydrophilic substances possessing dispersing properties in an aqueous medium. As examples of such materials, the following, inter alia, have been found to function in the manner hereinbefore described: meals prepared from oil-bearing seeds after removing the major portion of the oil by means of pressure, solvent extraction, or by the expeller process or other suitable means, e. g., meals obtained from cottonseed, maize, flaxseed, sesame seed, soya beans, peanuts, copra, cocoa beans, wheat germ, corn germ, etc. Meals prepared from cereals or other vegetative materials relatively low in oil content may also be used, such as oatmeal, barley meal, wheat meal, hominy meal, alfalfa meal, dried grass powder, etc. Vegetable meal by-products of the distilling industry, e. g., dried distiller's grain solubles such as dried corn solubles and dried rye solubles are also quite applicable for use in the process of the invention. We prefer to use meals prepared from oil-bearing seeds from which the major portion of the oil has been removed by the expeller process or by the cold-pressing process.

While some of these vegetable materials, and particularly the meals produced from oil-bearing seeds by the aforementioned processes, may contain up to about 8 per cent oil, the expression "relatively oil-free vegetable material" will be used herein to connote the broad class of materials which may be used, including such seed meals.

In treating the meals with acetic acid-solvent mixture prior to the addition of the vitamin-rich material thereto, any suitable fat or polar solvent may be employed along with the acetic acid. Thus, solvents such as acetone, ethylene dichloride, heptane, methanol, ethanol, isopropanol, other alcohols, etc., are all applicable to the process of the invention. As aforementioned, if the vegetable material which is being employed in the process is one which is substantially completely oil free (containing up to 3 or 4 per cent oil) it is preferred to omit the use of organic solvents and merely use an aqueous acetic acid solution.

Any suitable natural or synthetic material rich in any one or more of the fat-soluble vitamins A, D and E may be used according to the invention, the corresponding pro-vitamins being included under the generic expression "vitamins." It is preferred to use animal, vegetable or marine oils rich in the fat-soluble vitamins, such as, for example, cod liver oil, halibut liver oil, shark liver oil, sardine oil, tuna liver oil, palm oil and like oils, concentrates and fractions thereof, or such oils fortified with vitamin concentrates. Other sources of the fat-soluble vitamins, such as antirachitic activated sterols and the like, may also be used alone or in conjunction with the aforementioned or other vitamins. While the vegetable materials employed normally contain vitamins B1 and G, additional quantities of these vitamins, as well as other water-soluble vitamins such as vitamin C, biotin, calcium pantothenate, pyridoxine or the like, may be added if desired.

For a fuller understanding of the nature and objects of the invention, reference should be had to the following examples which are given merely to further illustrate the invention and are not to be construed in a limiting sense, all parts given being by weight:

Example I 476 parts of a 50-50 mixture of linseed meal and wheat germ pressed cake flour was mixed with 300 parts of 20 per cent aqueous acetic acid and the mixture heated at about 60° C. for one hour. 300 parts of water were then added and the mixture thoroughly stirred for 20 minutes. A thick, pasty slurry resulted. 25 parts of a fish liver oil blend containing 225,000 units of vitamin A/gm. and 40,000 U. S. P. units of vitamin D/gm. were added and the mass stirred for 30 minutes. The mixture was then placed in a vacuum oven maintained at 160° F. for 8 hours. The dried cake was then removed and ground. The resulting non-oily powder was stored at room temperature in contact with the atmosphere for six months, with the result that no decrease in the vitamin A and D potency occurred.

Example II 5 parts of pressed cottonseed meal were agitated for one hour with 3.5 parts of acetone containing 5 per cent glacial acetic acid. On standing, the supernatant liquid was dark brownish-black in color. Most of the solvent was removed from the meal-solvent mixture by evaporation under reduced pressure, and sufficient water (7.5 parts) was then added to form a thick paste. While stirring, 0.5 part of a highly potent fish liver oil (60,000 I. U. of vitamin A and 9,000 U. S. P. units of vitamin D/gm.) was added and the mixture thoroughly emulsified. The mass was then dried in a vacuum drier and the dry material pulverized. After three months' storage, less than 10 per cent of the vitamin A had been destroyed, while direct mixing of oil into the meal by ordinary means results in practically complete destruction of the vitamin A in a similar period.

Example III 2 parts of soya bean meal were agitated for 2 hours with 1.5 parts of acetone containing 5 per cent glacial acetic acid. The acetone was removed by vacuum distillation and 4 parts of water added to form a thick paste. 0.2 part of a highly potent fish liver oil (68,600 I. U. of vitamin A/gm. and 9,200 U. S. P. units of vitamin D/gm.) was added, slowly stirred in, the mass dried at 140° F. under vacuum and ground. The resulting dry product had a vitamin A potency of 5500 I. U. units of vitamin A per gram. After about 5 months' storage, the vitamin potency of the dry powder was within 15 per cent of its original value, while direct mixing of the oil into the meal by ordinary means results in 100 per cent destruction of the vitamin A in a similar period.

The dry vitamin products of the invention may be used to fortify dry or wet poultry mashes, prepared animal feeds, cereals, flours, milk powder, malt powder, etc., or for the production of vitamin-bearing tablets of increased stability which may or may not have an exterior sugar or like coating, etc.

While the invention is particularly concerned with the incorporation into a vegetable carrier of vitamins A, D and/or E, vitamins B, C, G, or other water-soluble vitamins may also be incorporated individually or collectively along with either one or more of the vitamins A, D and/or E. From the foregoing, it is clear that a stable edible vitamin-fortified product in dry form has been successfully produced. As hereinabove stated, the vitamin potency of the dried product is maintained substantially constant for relatively long periods of time.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process of producing a dry, vitamin-fortified product which comprises treating a relatively oil-free vegetable material containing natural antioxidants and natural hydrophilic dispersing substances with acetic acid to liberate antioxidants in said vegetable material, forming an aqueous slurry of said material, dispersing a fat-soluble vitamin-containing material in the aqueous slurry and finally drying the mass.

2. A process of producing a dry, vitamin-fortified product which comprises treating a relatively oil-free vegetable material containing natural antioxidants and natural hydrophilic dispersing substances with aqueous acetic acid to liberate antioxidants in said vegetable material, forming an aqueous slurry of said material, dispersing a fat-soluble vitamin-containing material in the aqueous slurry and finally drying the mass.

3. A process of producing a dry, vitamin-fortified product which comprises treating a relatively oil-free vegetable material containing natural antioxidants and natural hydrophilic dispersing substances with acetic acid-organic solvent mixture to liberate antioxidants in said vegetable material, forming an aqueous slurry of said material, dispersing a fat-soluble vitamin-containing material in the aqueous slurry and finally drying the mass.

4. A process of producing a dry, vitamin-fortified product which comprises treating an oil-bearing seed meal with acetic acid to liberate antioxidants in said meal, forming an aqueous slurry of said material, dispersing a fat-soluble vitamin-containing material in the aqueous slurry and finally drying the mass.

5. The process of claim 4 wherein an expeller meal is used.

6. The process of claim 5 wherein a cold pressed meal is used.

7. A process of producing a dry, vitamin-fortified product which comprises treating an oil-bearing seed meal with acetic acid-organic solvent mixture to liberate antioxidants in said meal, removing the organic solvent, forming an aqueous slurry of said material, dispersing a fat-soluble vitamin-containing material in the aqueous slurry and finally drying the mass.

8. A process of producing a dry, vitamin-fortified product which comprises treating soybean meal with acetic acid to liberate antioxidants in said meal, forming an aqueous slurry of said material, dispersing a fat-soluble vitamin-containing material in the aqueous slurry and finally drying the mass.

9. A process of producing a dry, vitamin-fortified product which comprises treating cottonseed meal with acetic acid to liberate antioxidants in said meal, forming an aqueous slurry of said material, dispersing a fat-soluble vitamin-containing material in the aqueous slurry and finally drying the mass.

10. A process of producing a dry, vitamin-fortified product which comprises treating a mixture of wheat germ meal and linseed meal with acetic acid to liberate antioxidants in said meal, forming an aqueous slurry of said material, dispersing a fat-soluble vitamin-containing material in the aqueous slurry and finally drying the mass.

ANDRÉ E. BRIOD.
LORAN O. BUXTON.